United States Patent Office 3,284,195
Patented Nov. 8, 1966

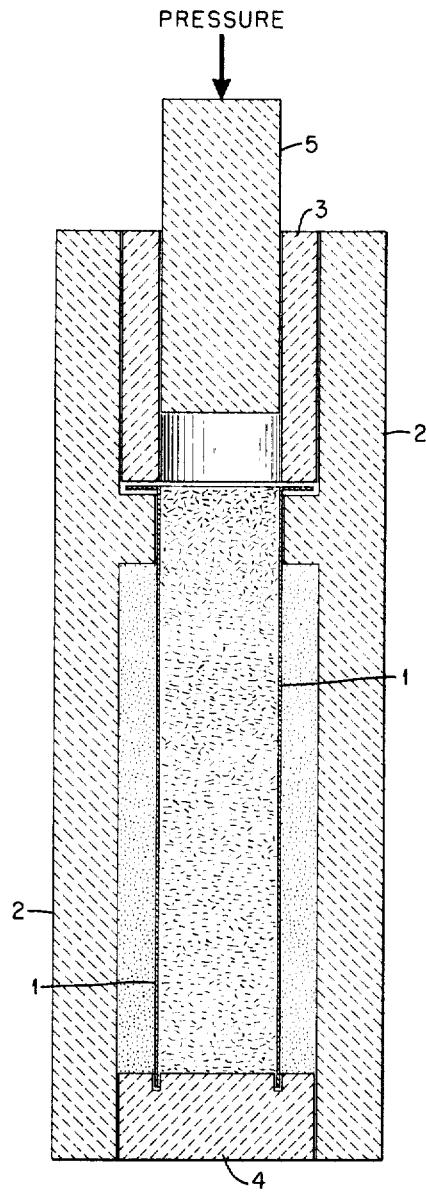

3,284,195
METHOD OF FABRICATING ARTICLES
FROM POWDERS
John M. Googin and Lawrence M. McLaughlin, Oak
Ridge, Tenn., assignors to the United States of America
as represented by the United States Atomic Energy
Commission
Filed June 26, 1963, Ser. No. 292,197
5 Claims. (Cl. 75—226)

Our invention relates to methods of fabricating articles from powders.

As is well-known, articles made by hot-pressing powders are superior in many properties to articles made by cold-pressing, and the only method of directly forming non-porous compacts of precise dimensions from many powders is by hot-pressing. However, conventional methods suitable for hot-pressing are limited to relatively simple shapes. As the shapes become complex, undesirable density gradients are produced in the finished product because of non-uniform pressure distribution during pressing.

One method of pressing, isostatic pressing, avoids the disadvantages resulting from non-uniform distribution of pressure by transmitting pressure from the press to surfaces of the article by means of a fluid in pressure-transmitting relationship with these surfaces. However, high temperature isostatic pressing has not been economical because of the expensive apparatus needed to contain the fluid, a gas, at the elevated temperature and pressure.

It is accordingly one object of our invention to provide an improved method for fabricating articles from powders.

It is another object to provide an improved method for isostatic hot-pressing powders.

Other objects will be apparent from the following detailed description and the claims appended thereto.

In accordance with our invention we have provided an improvement in a method of making a body from a powder comprising the steps of confining a mass of said powder within a die cavity and applying pressure to said powder mass, said improvement comprising the steps of placing a mass of flake graphite in pressure-transmitting relationship with a surface of said body, and transmitting pressure to said body through said flake graphite.

The figure illustrates a simple device for carrying out our invention to form a thin-walled cylinder.

We have found that flake graphite, although it remains a solid in the sense that the graphite particles retain their identity and shape, exhibits some of the properties of a fluid in transmitting pressure. The graphite must be natural flake graphite. We have found that other forms of carbon such as powdered graphite or carbon black are not satisfactory pressure-transmitting media. The natural flake graphite suitable for our method comprises small platelets composed of hexagonal crystals of rhombic symmetry. We have found that platelets which pass through an 80 mesh screen and are retained on a 325 mesh screen are suitable for our pressing method. The ratio of the area of the faces to the area of the edge of the platelets for natural flake graphite having a particle size between 80 and 325 mesh will typically average about 9:1.

The temperature and pressure used in our isostatic pressing method are not critical, the flake graphite having excellent pressure-transmitting properties at all temperatures and pressures; the upper limits of temperature and pressure are dictated by equipment limitations. In view of the physical properties of flake graphite it is especially useful at temperatures above those at which liquids can be used as pressure-transmitting media. Time cycles, pressures and temperatures normally used in conventional pressing methods are equally useful in our method.

An unexpected attribute of flake graphite making it exceptionally useful in pressing some powders is its inert nature with materials such as beryllium, tungsten, uranium monocarbide and uranium mononitride which react with other forms of carbon at an elevated temperature. The reason for this difference in behavior between flake graphite and carbon in a form such as carbon black is not known, but it is believed that the face of the graphite platelet, which under pressure comprises the principal area of contact between the graphite and the powder being formed, is less reactive than the edges of the platelet.

Our invention is useful in forming bodies from any powder of one or more metals, ceramics, or a mixture of metals and ceramics.

The following example is given to illustrate our invention in more detail.

*Example*

The die of the figure is used to form a beryllium body by placing beryllium powder in the annular cavity defined by a stainless steel membrane 1 and a graphite die 2. The filled cavity is sealed at the top by sleeve 3 and at the bottom by plug 4. The cylindrical cavity formed by membrane 1 is filled with natural flake graphite in the size range of 80 to 325 mesh and having a face-to-edge area ratio averaging 9:1. The die assembly is pressed at 2000 pounds per square inch for one-half hour at 1100° C. by exerting a force on graphite plug 5 to compress the natural flake graphite. The pressing is started cold and 6 hours are required to complete the pressing. The resulting compact, 7.5 inches high and having a wall thickness of 3/8 inch, has a density very near theoretical, and the density throughout the compact is uniform.

It is not possible to achieve uniform density throughout a body shaped as the one formed in the above example with prior art pressing methods.

In the foregoing example the steel membrane was used to keep the beryllium powder in the desired form, not to prevent contact between beryllium powder and the graphite, since, as taught above, natural flake graphite is inert with respect to beryllium metal powder.

Although our method is especially useful in making compacts having intricate shapes, it works equally well for a body having a simple shape. Modifications in the time, temperature and pressure of pressing as well as in the shape of the compact and powder used may be readily made by workers in the art, and our invention should be limited only as is indicated by the attached claims.

What is claimed is:

1. In a method for making a body from a metal value-containing powder by confining a mass of said powder within a die cavity, and applying pressure to said mass, the improvement comprising the steps of placing a mass of flake graphite in pressure-transmitting relationship with a surface of said body, and transmitting pressure to said body through said graphite.

2. In a method for making a body from a metal value-containing powder by confining a mass of said powder within a die cavity, and applying pressure to said mass, the improvement comprising the steps of placing a mass of flake graphite in pressure-transmitting relationship with a surface of said body, transmitting pressure to said body through said flake graphite, and heating said body to an elevated temperature while maintaining said pressure on said body.

3. The method of claim 2 wherein said flake graphite comprises particles with the size range of 80 mesh to 325 mesh.

4. The method of claim 2 wherein said flake graphite comprises particles within the size range of 80 mesh to 325 mesh and having a ratio of face area-to-edge area averaging about 9:1.

5. In a method of making a body from a powder selected from the group consisting of beryllium, tungsten, uranium monocarbide and uranium mononitride by confining a mass of said powder within a die cavity and applying pressure to said mass, the improvement comprising the steps of placing a mass of flake graphite in pressure-transmitting relationship with a surface of said body, transmitting pressure to said body through said flake graphite, and heating said body to an elevated temperature while maintaining pressure on said body.

References Cited by the Examiner

UNITED STATES PATENTS

| 1,226,470 | 5/1917 | Coolidge | 75—214 |
| 2,220,018 | 10/1940 | McKenna | 75—214 |
| 2,725,288 | 11/1955 | Dodds et al. | 75—226 |
| 2,783,904 | 3/1957 | Hamjian | 75—214 |
| 3,101,260 | 8/1963 | Cheney | 23—209.10 |

FOREIGN PATENTS 203,909  11/1956  Australia.

L. DEWAYNE RUTLEDGE, *Primary Examiner.*

REUBEN EPSTEIN, CARL D. QUARFORTH, BENJAMIN R. PADGETT, *Examiners.*

R. L. GOLDBERG, R. L. GRUDZIECKI,
*Assistant Examiners.*